(No Model.)

C. W. BARKLEY.
ANIMAL TRAP.

No. 451,015. Patented Apr. 28, 1891.

WITNESSES
Chapman Fowler
J. Edw. Fowler

INVENTOR
Charles W. Barkley,
by A. H. Evans & Co
Attorneys

UNITED STATES PATENT OFFICE.

CHARLES W. BARKLEY, OF SEWARD, NEBRASKA.

ANIMAL-TRAP.

SPECIFICATION forming part of Letters Patent No. 451,015, dated April 28, 1891.

Application filed January 6, 1891. Serial No. 376,845. (No model.)

*To all whom it may concern:*

Be it known that I, CHARLES W. BARKLEY, a citizen of the United States, residing at Seward, in the county of Seward and State of Nebraska, have invented certain new and useful Improvements in Animal-Traps, as set forth in the accompanying drawings, forming part of this specification, in which—

Figure 1:
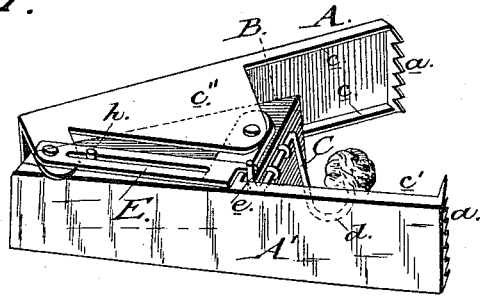
Figure 2:
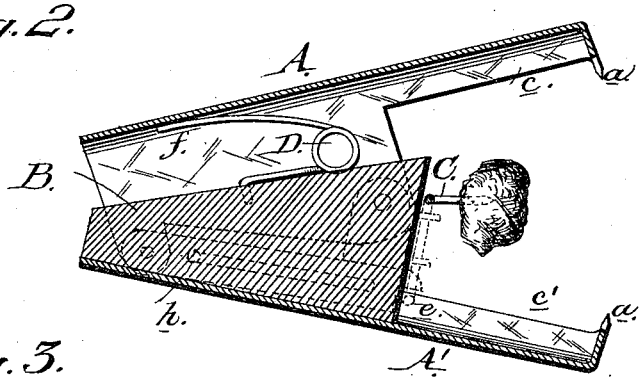
Figure 3:
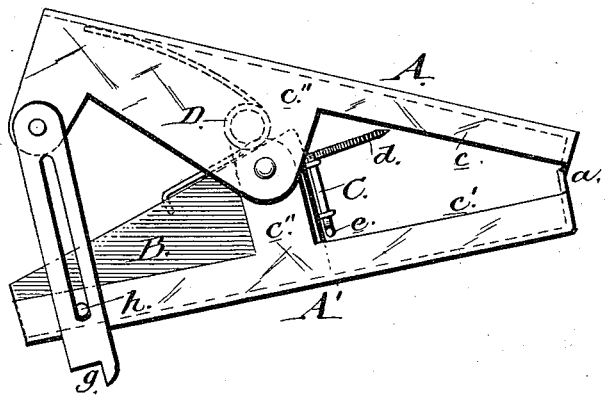

Figure 1 is a perspective view showing the trap set. Fig. 2 is a longitudinal sectional view of the same. Fig. 3 is a side view showing the trap closed.

My invention relates to animal-traps, and particularly to that class known as "jaw-traps." It is an improvement on my former patent, No. 330,668, granted to me November 17, 1885, for improvements in animal-traps; and it consists in the constructions, combinations, and arrangement of parts which I shall hereinafter fully describe and claim.

To enable others skilled in the art to which my invention appertains to make and use the same, I will now describe its construction and indicate the manner in which the same is carried out.

Referring to the accompanying drawings, A A' represent two jaws whose front edges have inwardly-turned teeth $a$, said jaws being composed entirely or in part of metal or wood, as may be desired; but in either case the front of the jaws which carry or are provided with the teeth will be of metal. The jaws A and A' are each provided with inwardly-turned sides $c$ $c'$ and with projecting ears $c''$, united together by a pin or screw, whereby the two jaws are pivotally secured. The jaw A' has confined between its sides a tapered block B of wood or other material whose front wall has secured to it the pivoted trigger C, composed of wire bent to form a hook $d$ for the bait, said trigger having also a short arm $e$ projecting above one of the sides of the jaw A', so that it may be engaged by a catch, as I shall hereinafter fully describe. The block has also secured to its inner surface a spring D, whose free arm $f$ bears up against the inner wall of the jaw A back of the line of pivotal movement, whereby the front of the jaws is closed when the trigger is sprung.

To the rear portion of one of the sides of the jaw A is pivotally secured one end of a swinging catch E, which is slotted longitudinally, and has its front end notched or formed with a lug $g$, which is designed to engage the projecting end of the short arm of the trigger to maintain the jaws in an open position, ready to be sprung by the animal trying to take the bait. From the side of the jaw A projects a pin $h$, which enters the slot in the catch to direct the movement of the catch, so that the front of said catch may engage the arm of the trigger.

The operation of the device is as follows: In its normal position the slotted catch stands nearly vertical or about at right angles with the jaw A', the pin $h$ resting in the bottom of the slot in the catch. When the trap is to be "set," the operator presses the rear ends of the jaws together to cause a corresponding separation of their front ends, the spring between the jaws being at the same time depressed. As the rear ends of the jaws approach each other the slotted catch, sliding upon the pin $h$, is caused to swing inward until it stands about parallel with the jaws A', and its free end engages and is held by the projecting arm of the trigger. This engagement of the catch with the trigger sets the trap, which is maintained with open jaws until the animal attempts to take the bait, when the depression of the trigger releases the catch from its engagement with the short arm of said trigger, and permits the spring to close the jaws upon the animal.

This trap is cheaply made, is simple in its construction, is automatically set by the opening of the jaws, and is very effective in its operation.

Having thus described my invention, what I claim as new, and desire to secure by Letters Patent, is—

1. In an animal-trap, the two jaws pivoted together and a pivoted trigger having a projecting arm, in combination with a slotted catch pivoted to one of said jaws and having its free end adapted to engage the arm of the trigger, and a pin projecting from the other jaw, engaging the slot of the catch, and automatically moving the catch inward to engage the trigger-arm when the trap is set, substantially as herein described.

2. In an animal-trap, the jaw A and the jaw A', pivoted thereto and provided between its inner walls with a block B, in combination with a trigger pivotally secured upon the front of the block and having a short arm projecting above the side of the jaw, a slotted catch pivotally secured at one end to the jaw A and having its free end adapted to engage the arm of the trigger, a pin on the side of the jaw A' entering the slot of the catch and directing the catch inward to the arm of the trigger when the trap is opened, and a spring between the jaws for closing them when the trigger is released from the catch, substantially as herein described.

CHARLES W. BARKLEY.

Witnesses:
GEO. W. LOWLEY,
B. F. NORVAL.